(12) United States Patent
Falk et al.

(10) Patent No.: US 9,361,265 B2
(45) Date of Patent: Jun. 7, 2016

(54) METHOD AND DEVICE FOR INTEGRATING A DEVICE INTO A NETWORK

(75) Inventors: Rainer Falk, Poing (DE); Wolfgang Klasen, Ottobrunn (DE); Guido Stephan, Egmating (DE)

(73) Assignee: Siemens Aktiengesellschaft, Munich (DE)

( * ) Notice: Subject to any disclaimer, the term of this patent is extended or adjusted under 35 U.S.C. 154(b) by 248 days.

(21) Appl. No.: 13/813,618

(22) PCT Filed: Jul. 8, 2011

(86) PCT No.: PCT/EP2011/061646
§ 371 (c)(1),
(2), (4) Date: Jan. 31, 2013

(87) PCT Pub. No.: WO2012/016793
PCT Pub. Date: Feb. 9, 2012

(65) Prior Publication Data
US 2013/0132541 A1    May 23, 2013

(30) Foreign Application Priority Data
Aug. 3, 2010   (DE) .......................... 10 2010 033 230

(51) Int. Cl.
G06F 15/177    (2006.01)
G06Q 10/08     (2012.01)
H04L 12/24     (2006.01)
(Continued)

(52) U.S. Cl.
CPC ............ *G06F 15/177* (2013.01); *G06Q 10/087* (2013.01); *H04L 9/3236* (2013.01); *H04L 41/0806* (2013.01); *H04L 41/0846* (2013.01); *H04L 41/0886* (2013.01); *H04L 63/0272* (2013.01); *H04L 29/12018* (2013.01); *H04L 41/0809* (2013.01); *H04L 61/10* (2013.01); *H04L 2209/805* (2013.01)

(58) Field of Classification Search
CPC ............ H04L 41/0813; H04L 41/0823; H04L 41/0869; H04L 41/12; G06F 15/177
USPC .......................................... 709/222; 726/4–5
See application file for complete search history.

(56) References Cited

U.S. PATENT DOCUMENTS 6,177,860 B1   1/2001  Cromer et al.
8,049,594 B1 * 11/2011 Baranowski ......... H04L 9/3271
                                                        340/10.1

(Continued)

FOREIGN PATENT DOCUMENTS

CN    101467131    6/2009
EP    1 887 758    2/2008

*Primary Examiner* — Duyen Doan
(74) *Attorney, Agent, or Firm* — Cozen O'Connor

(57) ABSTRACT

A method and a server for integrating a device into a network, a first device identification of the device is detected being a reading device authorized for this purpose, and the detected first device identification being transmitted as configuration data into an access-protected configuration data memory of the network. The first device identification of the device is transmitted from the reading device to the configuration data memory and stored in the memory. After the device to be integrated is connected to an access node of the network, the server automatically configures the connected device for the network if a corresponding first device identification of the device is already stored in the access-protected configuration data memory of the network for the second device identification of the device connected to the access node of the network such that an efficient and secured integration of a communication-enabled terminal into a network is achieved.

21 Claims, 2 Drawing Sheets

(51) Int. Cl.
  *H04L 29/06* (2006.01)
  *H04L 9/32* (2006.01)
  *H04L 29/12* (2006.01)

(56) References Cited

U.S. PATENT DOCUMENTS

| | | |
|---|---|---|
| 8,181,262 B2 | 5/2012 | Cooper et al. |
| 2004/0169587 A1* | 9/2004 | Washington ....... G06K 7/10079 340/573.1 |
| 2005/0256939 A1 | 11/2005 | Naismith et al. |
| 2006/0031922 A1* | 2/2006 | Sakai ................... H04L 63/164 726/1 |
| 2006/0109123 A1* | 5/2006 | Carrender .......... G06K 19/0723 340/572.1 |
| 2006/0109130 A1* | 5/2006 | Hattick ................ G06K 19/045 340/572.7 |
| 2007/0022469 A1 | 1/2007 | Cooper et al. |
| 2008/0095369 A1 | 4/2008 | Lucidarme |
| 2008/0175224 A1 | 7/2008 | Andrews |
| 2008/0238676 A1* | 10/2008 | Dhillon .............. G08B 13/2482 340/572.1 |
| 2009/0121897 A1* | 5/2009 | Muhlethaler ...... G07C 9/00079 340/908 |
| 2010/0161969 A1* | 6/2010 | Grebovich ............. H04L 9/321 713/156 |
| 2010/0259361 A1* | 10/2010 | Al Shahrani .......... E01F 13/126 340/5.71 |

\* cited by examiner

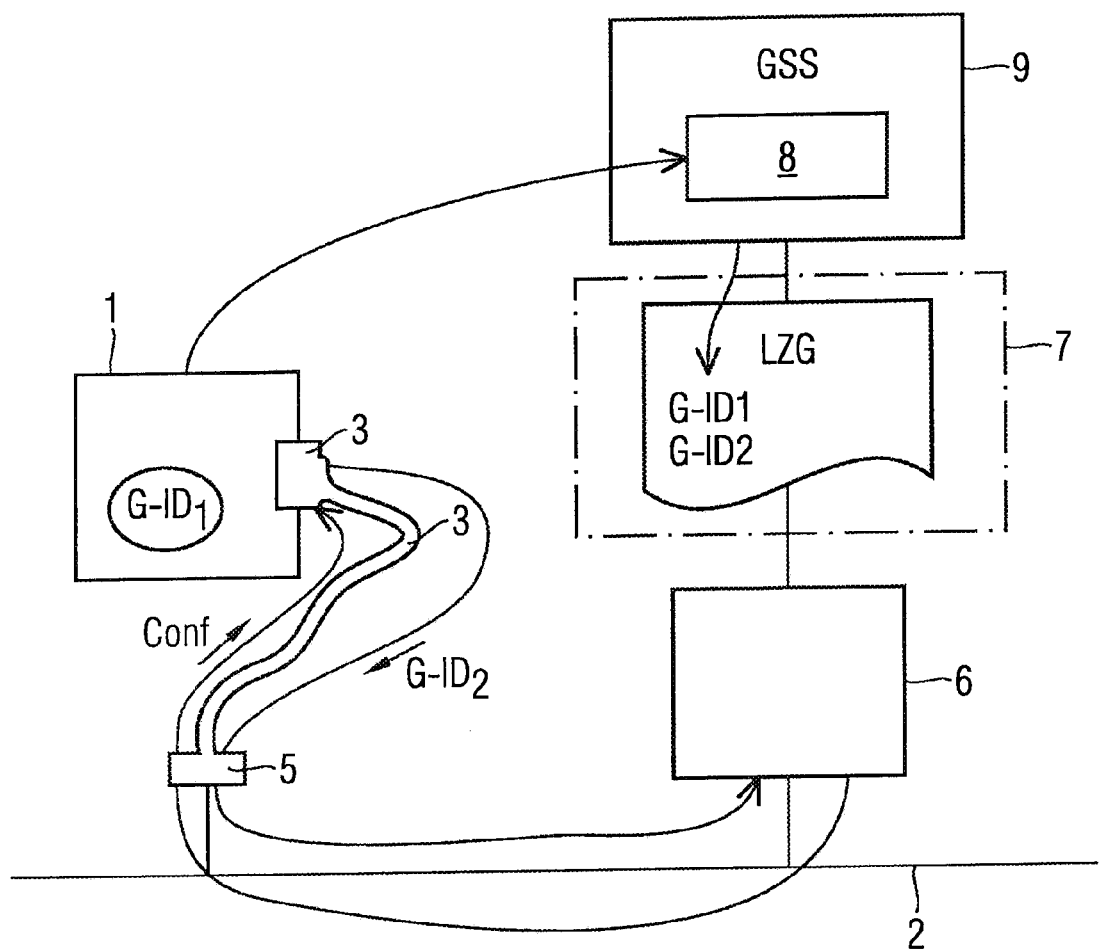

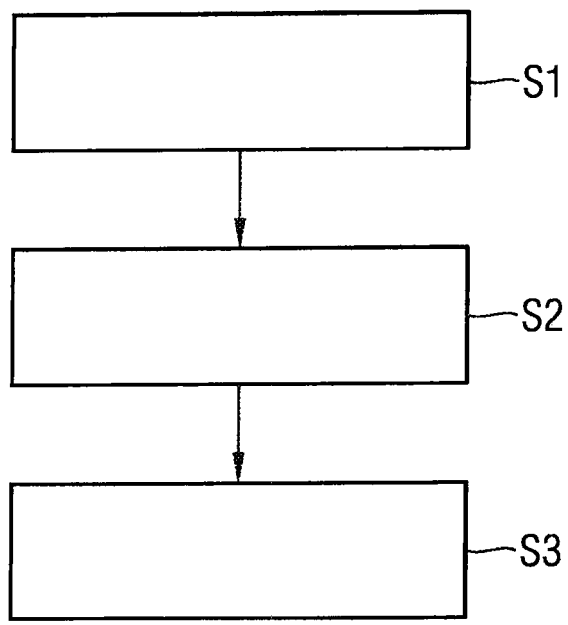

METHOD AND DEVICE FOR INTEGRATING A DEVICE INTO A NETWORK

CROSS-REFERENCE TO RELATED APPLICATIONS

This is a U.S. national stage of application No. PCT/EP2011/061646 filed 08 Jul. 2011. Priority is claimed on German Application No. 10 2010 033 230.5 filed 3 Aug. 2010, the content of which is incorporated herein by reference in its entirety.

BACKGROUND OF THE INVENTION

1. Field of the Invention The invention relates to a method and apparatus for integrating a device into a network and, more particularly, to a method and apparatus for secured integration of a control device into an automation network.

2. Detailed Description of the Related Art For a communication-enabled device, for example, a field device, such as a control device, an intelligent sensor or actuator, to be integrated into a communication network, configuration settings have to be set at the device.

The configuring device here can communicate with a higher-order server, for example, an automation server of a process control system or a programmable controller or a control room, to obtain configuration settings. It is necessary here to secure the exchange of data by way of the communication link between the device and the server cryptographically, for example, by encrypting the data or calculating a cryptographic checksum.

For the data exchanged between the device and the server to be able to be cryptographically encrypted, the device requires a cryptographic key or password, which has to be configured at the device. The configuration of cryptographic keys or passwords at devices is generally associated with a high level of administrative outlay. Also, the inputting or configuration of the cryptographic key or password at the device is error-prone. As a result, a major time outlay is usually required to install and commission a communication-enabled device. As the security of the entire network is also dependent on the configuration, configuring must also occur in a secured manner.

SUMMARY OF THE INVENTION

It is therefore an object of the present invention to create a method and apparatus for incorporation into a network, which allow efficient and secured setting up of a configuration setting at a communication-enabled device.

This and other objects and advantages are achieved in accordance with the invention by a method for integrating a device into a network including the steps of detecting a first device identification of the device by a reading device, which is authorized to transmit the detected first device identification as configuration data to an access-protected configuration data memory of the network, where the first device identification of the device is transmitted from the reading device to the configuration data memory of the network and is stored therein and connecting, the device to be integrated to an access node of the network, where the device is identified to a server of the network by a second device identification. The method also includes the step of automatically configuring the connected device for the network by the server, if an associated first device identification of the device is already stored in the access-protected configuration data memory of the network for the second device identification of the device connected to the access node of the network.

In one possible embodiment of the inventive method, the first device identification comprises an optical identifiable barcode affixed to the device.

In a further possible embodiment of the inventive method, the first device identification comprises an optically detectable type plate or label of the device.

In one possible embodiment of the inventive method, the first device identification comprises a readable RID identifier of the device.

In another possible embodiment of the inventive method, the device is connected by way of a wireless communication interface to the access node of the network.

In an alternative embodiment of the inventive method, the device is connected by way of a wired communication interface to the access node of the network.

In a further possible embodiment of the inventive method, the second device identification is a manufacturer's identification.

It is also possible for the second device identification to comprise a serial number or a MAC address of the device.

In one possible embodiment of the inventive method, the device to be integrated authenticates its second device identification to the server of the network via a cryptographic key and/or a digital certificate.

In another possible embodiment of the inventive method, the detected first device identification is provided with a time stamp and deleted automatically from the configuration data memory of the network after the end of a settable time period.

In still another possible embodiment of the inventive method, the second device identification of the device connected to the network is checked by the server of the network to determine whether a first device identification associated with the second device identification is already present in the access-protected configuration data memory of the network.

In yet another possible embodiment of the inventive method, the first device identification and the second device identification are identical.

In another possible embodiment of the inventive method, the second device identification is a digital certificate, which contains the first device identification.

In a further possible embodiment of the inventive method, the first device identification and a hash value of the second device identification are identical.

In an alternative embodiment of the inventive method, a hash value of the first device identification and the second device identification are identical.

In a further possible embodiment of the inventive method, the first device identification and the hash value of the cryptographic key or digital certificate used to authenticate the second device identification to the server of the network are identical.

In one possible embodiment of the inventive method, the device connected to the access node of the network identifies and authenticates itself to the server of the network.

In a further possible embodiment of the inventive method, the automatic configuration of the connected device is executed in a cryptographically secured manner by the server.

In a further possible embodiment of the inventive method, the first device identification comprises a cryptographic checksum, which is verified by the reading device, before the first device identification is stored by the reading device in the configuration data memory of the network.

It is also an object of the invention to provide a server for integrating a device into a network, where the server has access to a configuration data memory of the network, in which first device identifications of permitted devices can be stored by a reading device authorized to do so, after connection of a device to an access node of the network, and where the server automatically configures the device if an associated first device identification of the device is already stored in the configuration data memory of the network for a second device identification of the device transmitted by way of the network to the server.

In one possible embodiment of the inventive server, the server configures the device connected to the access node of the network in that the server transmits configuration settings, which comprise cryptographic keys, certificates and/or passwords, by means of dynamic host configuration protocol (DHCP), universal plug and play (UPNP), trivial file transfer protocol (TFTP), hypertext transfer protocol (http) or simple network management protocol (SNMP) by way of the network and its access node to the connected device.

In one possible embodiment of the inventive server, the configuration data memory, to which the server has access, is provided in a file server of the network or in a directory service of the network or in a database.

In one possible embodiment of the inventive server, the server serves to integrate a device into an automation network.

In one possible embodiment the network is a wired or wireless network.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Possible embodiments of the inventive method and apparatus for integrating a device into a network are also described with reference to the accompanying figures, in which:

FIG. 1 shows a diagram to clarify a possible embodiment of the inventive method for integrating a device into a network; and FIG. 2 shows a flow diagram to illustrate a possible embodiment of the inventive method for integrating a device into a network.

DETAILED DESCRIPTION OF THE PREFERRED EMBODIMENTS

As shown in FIG. 1, a device 1 can be integrated into network 2 in the illustrated example. In the exemplary embodiment illustrated in FIG. 1, the network 2 is a wired automation network with various units, which are connected to one another by a databus.

The device 1 to be connected has a communication interface 3, which in the illustrated example, can be connected by a cable 4 to an access node 5 of the automation network 2.

The automation network 2 also comprises a server 6, which is provided inter alia to integrate a device into the network 2. The server 6 here has access to a configuration data memory 7 of the network, in which a reading device 8 writes data, or where data is read out from the reading device 8 by the configuration data memory 7. In the exemplary embodiment illustrated in FIG. 1, the reading device 8 is located at a device security gate 9. The device security gate 9 is preferably access-protected, so that only authorized persons have access thereto.

The integration of the device 1 into the automation network 2 can be performed in a number of steps. As shown in the flow diagram in FIG. 2, in a step S1 a first device identification G-ID1 of the device 1 is detected by the reading device 8. The first device identification G-ID1 can be an optically identifiable barcode affixed to the device 1. In a further possible embodiment, the first device identification is an optically detectable type plate or label of the device 1. The first device identification G-ID1 can also be a readable RFID identifier of the device 1. The first device identification can also be a combination of different first device identifications and is detected by the reading device 8 in step S1, the reading device 8 being authorized to transmit the detected first device identification G-ID1 as configuration data in the access-protected configuration data memory 7 of the network. In one possible embodiment, the reading device 8 has an optical sensor or camera to detect an optically identifiable barcode of an optically detectable type plate or label of the device 1. Alternatively, the reading device 8 can have an RFID transceiver to read an RFID identifier of the device 1. The reading device 8 can be a permanently installed device or a portable device. In the embodiment illustrated in FIG. 1, the reading device 8 is located in an access-protected device security gate 9. Alternatively, the reading device 8 can also be carried by a user authorized to do so to the device 1 to be integrated, in order to detect a first device identification G-ID1 of the device 1 there.

In a further step S2, the device 1 to be integrated is connected to the access node 5 of the automation network 2. The device 1 here can be connected by a wireless or, as shown in FIG. 1, by a wired communication interface to the access node 5 of the network 2.

The connected device 1 identifies itself to the server 6 of the network 2 by a second device identification G-ID2. In one possible embodiment, the second device identification G-ID2 is a manufacturer's identification, a serial number or a media access control (MAC) address of the device 1. The second device identification can also consist of a combination of a manufacturer's identification, a serial number or the MAC address of the device 1. In one possible embodiment, the device 1 to be integrated authenticates its second device identification G-ID2 to the server 6 of the network 5 by means of a cryptographic key and/or a digital certificate.

In a further step S3, the server 6 automatically configures the connected device 1 for the network 2, if an associated first device identification G-ID1 of the device 1 is already present in the access-protected configuration data memory 7 of the network 1 for the second device identification G-ID2 of the device 1 connected to the access node 5. The second device identification G-ID2 of the device 1 to be integrated into the network 2 is thus checked by the server 6 of the network 2 to determine whether an appropriate first device identification G-ID1 associated with the second device identification G-ID2 is already present in the access-protected configuration data memory 7 of the network 2. In one possible embodiment, the first device identification G-ID1 and the second device identification G-ID2 of the device 1 are identical. Alternatively, the first device identification G-ID1 and the second device identification G-ID2 can be different and associated with one another, i.e., if a predefined association function exists between the first and second device identification. In another possible embodiment, the second device identification G-ID2 is a digital certificate, which contains the first device identification G-ID1. Here, the first device identification G-ID1 can be contained particularly in an attribute field of the digital certificate. It is also possible for the first device identification G-ID1 and a hash value H(G-ID2) of the second device identification G-ID2 to be identical. Alternatively, the hash value H(G-ID1) of the first device identification G-ID1 can also be identical to the second device identification G-ID2. Here, the hash function H used can be, for example, a CRC function, an MD5 function, an SHA-1 or SHA-256 function.

It is further possible for the first device identification G-ID1 and a hash value of the cryptographic key K or digital certificate Z used to authenticate the second device identification G-ID2 to the server C of the network 2 to be identical. In one possible embodiment, a list of permitted devices for the automation network 2 is present in the access-protected configuration data memory 7. The automation server 6 then checks whether an input that can be assigned to the device identification G-ID2 is present in the list of permitted devices. If so, the communication-enabled device 1 connected to the access node 5 is permitted for the automation network 2. A plug and play configuration of the connected device 1 can then be effected. A plug and play configuration can relate to configuration settings that are stored on the device 1 itself or configuration settings that can be assigned to the device 1 and are stored, for example, in a memory of the automation server 6. Configuration of the permitted device 1 can comprise in particular the generation and storage of cryptographic credentials, such as cryptographic keys or digital certificates, and/or the configuration of network addresses, such as an IP address or a DNS name of the device 1 and/or servers.

In a further possible embodiment of the inventive method, the first device identification G-ID1 is provided with a time stamp on detection and deleted automatically from the configuration data memory 7 after the end of a settable time period. With this embodiment, a time-out function is implemented for the list of permitted devices, in other words, the input of a device ID into the list is automatically deleted, for example, after one hour or 24 hours, if no device 1 of a corresponding device ID is connected to the automation network 2 in this time period.

The device 1 connected to the access node 5 of the network 2 identifies and authenticates itself to the server 6 of the network 2 with the device identification G-ID2. Various network authentication procedures can be employed here, for example, using a digital certificate according to X.509 and/or using a cryptographic key, for example, a network authentication procedure according to MACsec, IPsec/IKE, SSL/TLS, 802.1x or an EAP-based authentication, whereby the device 1 is authenticated. If a cryptographic checksum is contained in the list of permitted devices as well as the device ID, in one possible embodiment the automation server 6 can also use the checksum to check a second checksum received by way of a communication interface 3 of the device 1, such as for identity. If the check is successful, a plug and play configuration of the device 1 to be integrated is then performed. In a further embodiment, the cryptographic checksums contained in the list of permitted devices 7 of the automation network 2 are used to secure the performance of the plug and play configuration of the device 1 to be integrated cryptographically, i.e., to secure plug and play communication cryptographically. Here, the cryptographic checksum can be used as a cryptographic key. It is further possible for a cryptographic key K to be derived from the cryptographic checksum, for example, by a key derivation function KDF. Examples of such a key derivation function are MD5, SHA-1, HMAC-MD5 or HMAC-SHA1. The cryptographic key K can then be employed, for example, for communication secured by MACsec, IPsec or TLS-PSK. In another embodiment, a network access control occurs, for example, by IEE802.1x port-based access control. The device 1 is identified or authenticated in this process. The authentication server 6 informs the access node 5 whether a connected device 1 is permitted. A RADIUS protocol or a DIAMETER protocol, for example, can be used for this purpose. The access node 5 can also be informed of a policy, for example the VLAN to which the device 1 is connected, for example, a guest VLAN, a production VLAN or a registration VLAN. If a device 1 to be integrated is contained in the list of permitted devices, it is connected to the registration VLAN. In contrast, an already registered device 1 is connected to a production VLAN. In one possible embodiment, the server 6 configures the device 1 connected to the access node 5 of the network 2, in that the server 6 transmits configuration settings, which comprise cryptographic keys, certificates and/or passwords, by means of DHCP, UPNP, TFTP, HTTP or SNMP by way of the network 2 and its access node 5 to the connected device 1.

The server 6 has access to the configuration data memory 7, as shown in FIG. 1. In one possible embodiment, the configuration data memory 7 is located in a file server of the network 2. It is further possible for the configuration data memory 7 to be located in a directory service of the network 2 or in a database.

The automation network 2 illustrated in FIG. 1 is, for example, an Ethernet, an IP network or a wireless network, in particular WLAN, Bluetooth, 802.15.4 or a ZigBee network.

With the inventive method therefore in a first phase device registration occurs, for example, by the reading device 8, which is located in a device security gate 9. In a second phase, specifically device network connection or installation, automatic configuration of the connected device 1 for the network 2 occurs, after the device 1 to be integrated has been connected to the access node 5 of the network 2. The first phase, specifically device registration, and the second phase, specifically device network connection or installation, can be executed at different times. For example, devices 1 are first registered at the device security gate 9 and written into the list of permitted devices in the configuration data memory 7. The registered device 1 is then stored, for example, in a company warehouse and only connected to an access node 5 of the automation network 2 for configuration purposes at a later time.

The device 1 can be different devices, i.e., communication-enabled automation devices for an automation network. The network 2 can also be a network of a vehicle, for example, a motor vehicle or a rail vehicle, to which a device 1 is to be connected. The network 2 can also be, for example, a network 2 of an energy supply company, to which a device 1 in the form of an intelligent energy gateway is to be connected.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for integrating a device into a network, comprising the steps of:
   (a) detecting, by a reading device located in an access-protected device security gate, a first device identification of the device, the reading device located in the access-protected device security gate being authorized to transmit the detected first device identification as configuration data to an access-protected configuration data memory of the network, and the first device identification of the device being transmitted from the reading device located in the access-protected device security gate to the configuration data memory of the network and being stored therein;
   (b) connecting the device to be integrated to an access node of the network, the device being identified to a server of the network by a second device identification; and
   (c) configuring automatically, by the server, the connected device for the network, if an associated first device identification of the device is already stored in the access-protected configuration data memory of the network for the second device identification of the device connected to the access node of the network, the automatic configuration of the connected device being executed in a cryptographically secured manner by the server.

2. The method as claimed in claim 1, wherein the first device identification comprises one of an optically identifiable barcode affixed to the device, an optically detectable type plate or label of the device, and a readable RFID identifier of the device.

3. The method as claimed in one of claim 1, wherein the device is connected by one of a wireless and wired communication interface to the access node of the network.

4. The method as claimed in one of claim 2, wherein the device is connected by one of a wireless and wired communication interface to the access node of the network.

5. The method as claimed in claim 1, wherein the second device identification comprises one of a manufacturer's identification, a serial number and a Media Access Control address of the device.

6. The method as claimed in claim 1, wherein the second device identification comprises one of a manufacturer's identification, a serial number and a Media Access Control address of the device.

7. The method as claimed in claim 1, wherein the device to be integrated authenticates its second device identification to the server of the network via at least one of a cryptographic key and a digital certificate.

8. The method as claimed in claim 1, further comprising the steps of:
   providing the detected first device identification with a time stamp; and
   deleting the detected first device identification automatically from the configuration data memory of the network after an end of a settable time period.

9. The method as claimed in claim 1, further comprising the step of:
   checking, by the server of the network, the second device identification of the device connected to the network to determine whether a first device identification associated with the second device identification is already present in the access-protected configuration data memory of the network.

10. The method as claimed in claim 1, wherein the first device identification and the second device identification are identical.

11. The method as claimed in claim 1, wherein the second device identification is a digital certificate, which contains the first device identification.

12. The method as claimed in claim 1, wherein one of the first device identification and a hash value of the second device identification are identical and a hash value of the first device identification and the second device identification are identical.

13. The method as claimed in claim 7, wherein the first device identification and a hash value of one of the cryptographic key and the digital certificate used to authenticate the second device identification to the server of the network are identical.

14. The method as claimed in claim 8, wherein the first device identification and a hash value of one of the cryptographic key and the digital certificate used to authenticate the second device identification to the server of the network are identical.

15. The method as claimed in claim 9, wherein the first device identification and a hash value of one of the cryptographic key and the digital certificate used to authenticate the second device identification to the server of the network are identical.

16. The method as claimed in claim 1, wherein the device connected to the access node of the network identifies and authenticates itself to the server of the network.

17. The method as claimed in claim 1, wherein the first device identification comprises a cryptographic checksum, which is verified by the reading device, before the first device identification is stored by the reading device in the configuration data memory of the network.

18. A server having a processor and memory for integrating a device into a network, the server having access to a configuration data memory of the network, in which first device identifications of permitted devices are storable by a reading device located in an access-protected device security gate and authorized to store the first device identifications,
   wherein the server is configured to:
      after connection of a device to an access node of the network, automatically configure the device if an associated first device identification of the device is already stored in the configuration data memory of the network for a second device identification of the device transmitted via the network to the server, the automatic configuration of the connected device being executed in a cryptographically secured manner by the server.

19. The server as claimed in claim 18, wherein the server configures the device connected to the access node of the network in that the server transmits configuration settings, which comprise at least one of cryptographic keys, certificates and passwords, by one of Dynamic Host Configuration Protocol, Universal Plug and Play, Trivial File Transfer Protocol, Hypertext Transfer Protocol and Simple Network Management Protocol via the network and its access node to the connected device.

20. The server as claimed in claim 19, wherein the configuration data memory, to which the server has access, is provided in one of a file server of the network, in a directory service of the network and in a database.

21. The server as claimed in claim 18, wherein the network is an automation network, the network being a wired or wireless network.

* * * * *